Sept. 26, 1967  M. LEVECQUE  3,344,009
APPARATUS FOR FORMING HOLLOW CYLINDERS OF
RESIN-IMPREGNATED MINERAL FIBER MATS
Filed Feb. 11, 1964  5 Sheets-Sheet 1
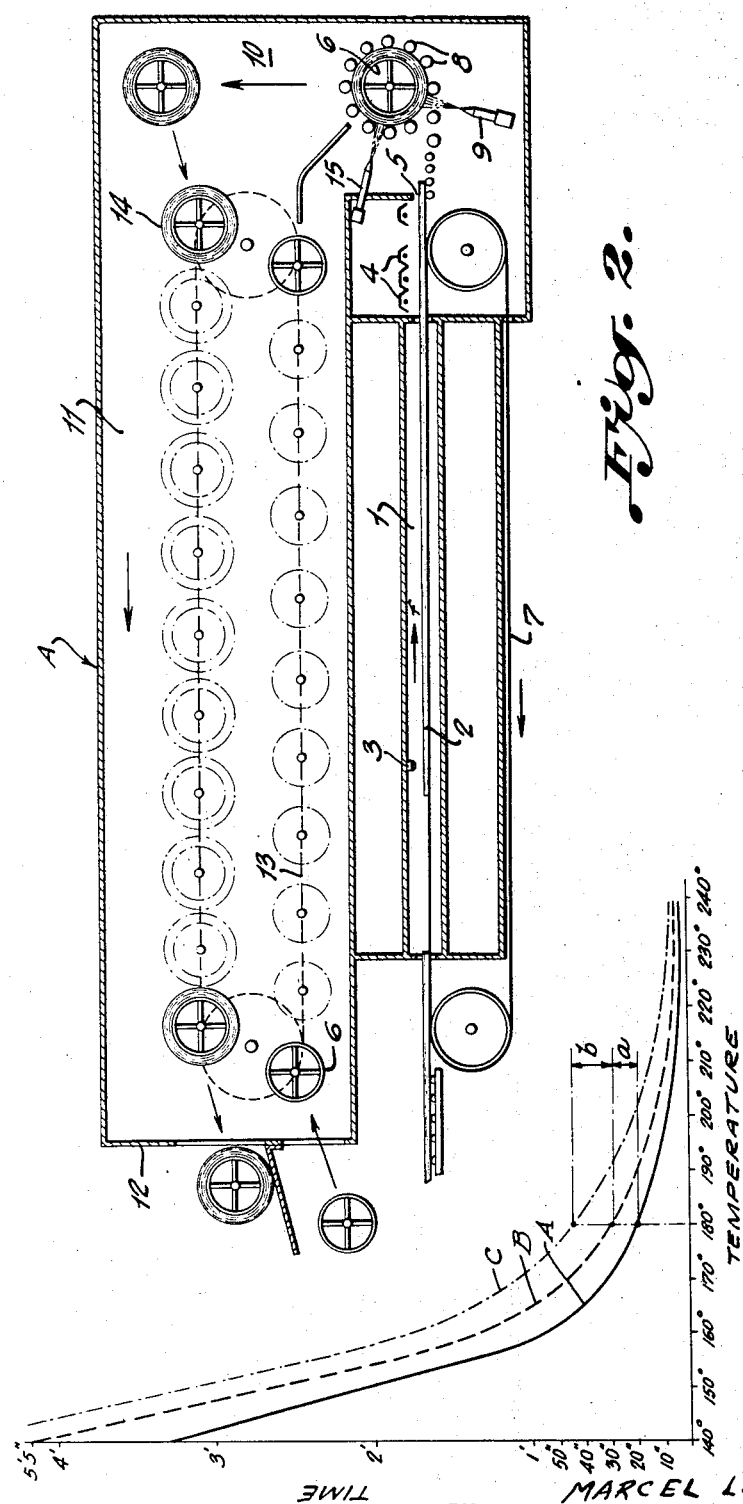
INVENTOR
MARCEL LEVECQUE
BY
Emmett F. Salter
ATTORNEY United States Patent Office  3,344,009
Patented Sept. 26, 1967

3,344,009
APPARATUS FOR FORMING HOLLOW CYLINDERS OF RESIN-IMPREGNATED MINERAL FIBER MATS
Marcel Levecque, Saint-Gratien, France, assignor to Compagnie de Saint-Gobain, Neuilly-sur-Seine, France, a corporation of France
Filed Feb. 11, 1964, Ser. No. 344,109
Claims priority, application France, Feb. 6, 1961, 851,805; Feb. 26, 1963, 926,112
12 Claims. (Cl. 156—446)

This application is a continuation-in-part of my application Serial No. 169,190, filed January 29, 1962, now abandoned.

The present invention relates to the manufacture of molded or shaped articles from mineral fibers, such as glass fibers, impregnated with a binder constituted by a heat-hardening resin. It is the special, but not exclusive, object of the invention to manufacture articles of hollow cylindrical form or shells which may be used especially as insulation for systems of pipes or conduits.

It is the object of the present invention to provide for the manufacture of these articles which permits, among other advantages, attaining a particularly rapid cadence or rhythm of production while at the same time the production of these articles with remarkable uniformity and homogeneity. In addition, this inventive process lends itself particularly well to continuous manufacture.

The process according to the invention also permits elimination of the operation, necessary in known processes, which consists in traversing a current of hot gas, such as steam, through the mass of glass fibers impregnated with the binder, in order to obtain polymerization of the binder.

The process according to the invention consists in impregnating a thin felt or mat of fibers with heat hardening resin prior to the molding or shaping operation, heating the thus impregnated felt or mat to secure the jellification of the resin, and bringing it to the state of a plastic polymer, after which the felt or mat is subjected to the molding or shaping operation, during the course of which, the resin is brought to the hard polymer state by a heating action.

According to one particularly advantageous characteristic of the invention, polymerization of the resin during the molding or shaping operation is so conducted that the resin is at the beginning of the hard polymer state at the end of said operation, the polymerization then continuing in a heated enclosure.

It is another object of the invention to adapt the process particularly to the manufacture of objects in the shape of hollow cylinders or shells, which may be used especially as insulators for tubes or pipes, and which are obtained by rolling the mat on a mandrel.

According to one characteristic of this improved adaptation, the band of matting, impregnated with jellified resin and brought to the plastic polymer state, is subjected to a pressure which has the effect of increasing its specific density, after which the band is wound on the mandrel.

The winding of the mat on the mandrel may be executed pneumatically. Thus, a hollow mandrel with perforations on its surface may be used, the interior of the mandrel being placed under reduced pressure. In this case, the invention contemplates putting the band of matting under pressure only at a certain distance from its front edge, in such a way that the non-affected part of the band can allow the beginning of winding on the mandrel under the effect of suction.

According to another characteristic of the invention, the mandrel cooperates with a counter-roller which rests on the coiled mat in such a way as to obtain a shell whose specific density has the desired value.

Conforming to another characteristic of the invention, the counter-roller is controlled so that its withdrawal speed with respect to the mandrel is made variable and a function of the density to be given to the shell.

The control of the withdrawal of the counter-roller with respect to the mandrel may be executed advantageously so that the counter-roller exerts only a smoothing action on the last coils of the winding.

According to another mode of execution of the invention, the mandrel on which the mat is to be mounted is introduced on a mechanical contrivance which conducts it to a post where winding takes place under the action of a controlling counter-roller, then to a post where smoothing takes place by the effect of a second moving counter-roller.

Other objects and purposes will appear from the detailed description of the invention following hereinafter, taken in conjunction with the accompanying drawings, wherein:

FIG. 1 shows a series of curves illustrating successive stages in the jellification of a resin at different temperatures;

FIG. 2 is a longitudinal vertical sectional view of an apparatus for producing cylindrical shells in accordance with the invention;

Figure 3:
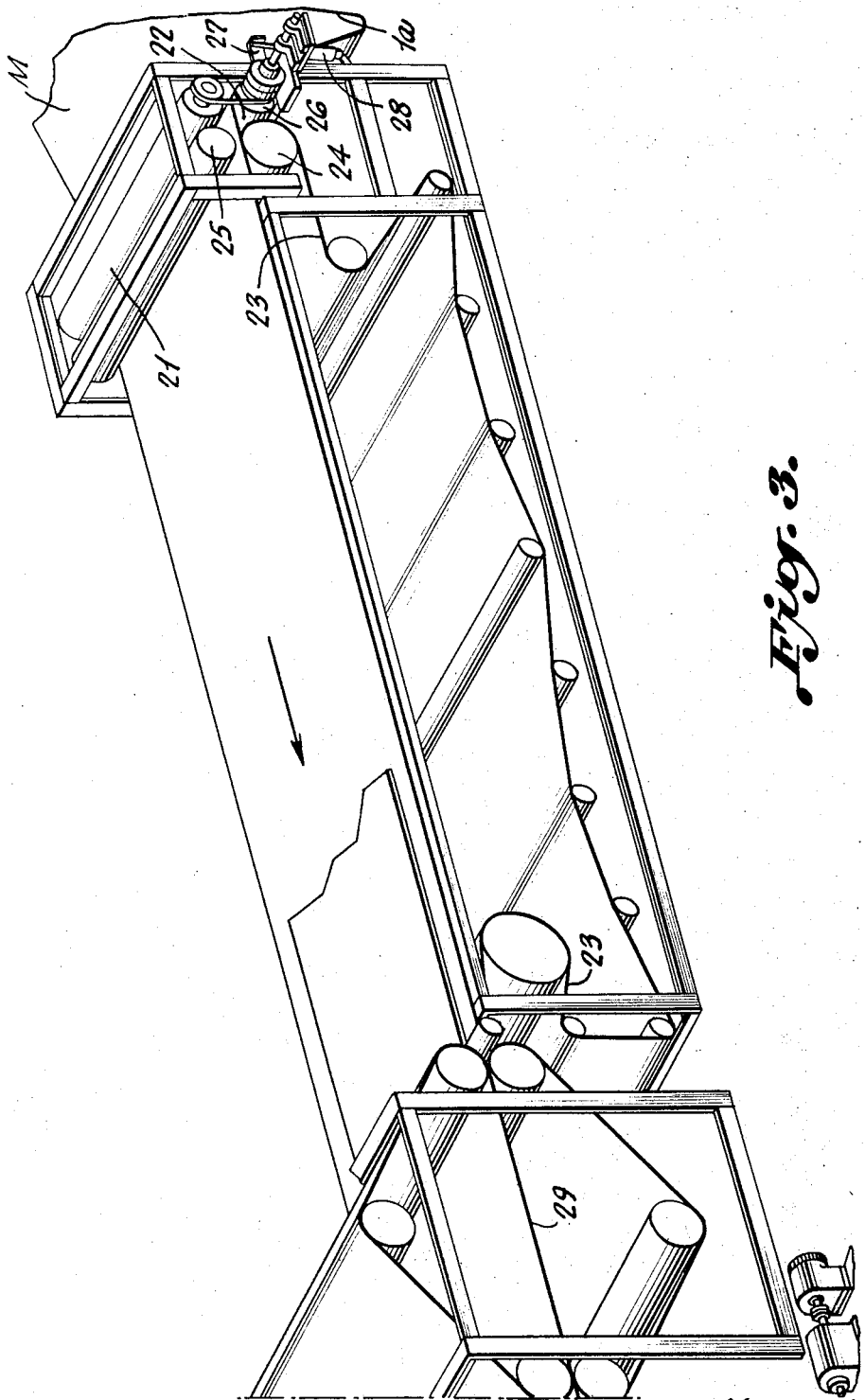
FIG. 3 is a perspective view of the inlet feeding station of a mat in a second embodiment of the invention.

The curves shown in FIG. 1 illustrate, by way of example, the test results made on the Maquenne block, relative to the polymerization of a heat-hardening phenol-formaldehyde resin of the type known in the trade as "Bakelite." These curves are plotted with different temperatures as abscissae and different time periods as ordinates. Curve A portrays the time of the beginning of jellification of the resin; curve B shows the beginning of the plastic polymer state of the resin; and curve C illustrates the beginning of the hard polymer state of the resin.

Practically, it is advantageous to operate at a temperature of 180° C., which is indicated by the vertical dotted line in FIG. 1. Thus, a time interval of about ten seconds, indicated by the distance $a$, is required to bring the resin from the beginning of the jellification stage to the beginning of the plastic polymer stage. An additional time interval $b$ of about fifteen seconds is required to bring the resin to the beginning of the hard polymer state.

The invention contemplates several arrangements for executing the inventive process described above. The first embodiment, illustrated in FIG. 2, is characterized by an arrangement comprising a stove or drying compartment which presents a first zone into which the thin previously resin-impregnated mat is passed, wherein means may possibly be provided for subjecting the mat to a complementary resin impregnation; a second zone in which is placed a mold or shaping mechanism; and a third zone which is traversed by the molded or shaped objects before leaving said drying or heating compartment.

In the case of the manufacture of shells, the felt or pad is shaped by winding on a mandrel with rollers cooperating with the mandrel and acting on the surface of the mat to effect this winding. After the mat is wound on the mandrel, it is ejected therefrom and travels through the heating compartment for a sufficient period of time to achieve polymerization.

It is also possible to provide coatings of powdered resin on the surface of the mat at the moment of its winding on the mandrel, or at the time of its deposit in the form of folds in the mold, thereby to secure better bonding between the layers.

The apparatus shown in FIG. 2 comprises a stove or heating compartment A having a pre-heating zone 1 into which are fed the thin mats 2. These mats or felts 2 may be, for example, of a thickness of the order of 1 cm., and these are previously impregnated with a heat-hardening resin. One or several devices 3 may be provided in this heating zone, which serve to atomize, dust or spray the heat-hardening resin onto the surface of each mat. Auxiliary heating means such as, for example, infrared tubes 4, may be provided at the outlet of this zone 1. Each mat is carried along in the direction of arrow $f$ by an endless conveyor 7.

During its passage through zone 1, the polymer is jellified and begins to polymerize, so that at outlet 5, the resin impregnating the mat is in the state of a plastic polymer. This change in state of the resin corresponds substantially to the time interval "$a$" between curves A and B of FIG. 1, for the "Bakelite" resin and the assumed temperature of 180° C.

One or more devices may be provided in the terminal part of the preheating zone 1 for atomizing the heat-hardening resin onto the mat.

Mat 2 leaving zone 1 is immediately carried onto the shaping device, which in the illustrated embodiment is exemplified by a mandrel 6 made up of a cylindrical sleeve mounted on spokes. This mandrel, which may be raised to a temperature close to that of the mat, is rotated about its axis, and cooperates with rollers 8 in such a way that the mat between the mandrel and rollers is wound around said mandrel.

Prior to winding the mat on the mandrel, its surface may be coated with a product such as talc, fine sand, etc., projected by injectors such as 9. This facilitates the stripping of the finished shell from the mandrel.

The rollers 8 are mounted so as to be movable radially with respect to the axis of the mandrel 6 in order to follow the variations in winding the mat according to the enlargement of the cylinder which is formed thereby. They are also mounted on a stand which permits shifting the mandrel when the winding is completed, so that the mandrel with the formed shell may be ejected in order to make room for a new mandrel.

The mandrel is in a zone 10 of the heating compartment, and the temperature and the duration of winding of the mat is such that the resin impregnating the mat is brought to the beginning of the hard polymer state after winding and discharge of the mandrel with the formed shell thereon. The change in state of the resin corresponds substantially to the time interval "$b$" of FIG. 1 for the "Bakelite" resin at 180° C.

Injectors 15 for the heat-hardening resin in fine particulate form may be provided in order to effect the coating of the surface of the mat just as the winding takes place, thereby to secure a better bond between the layers. These injectors may also be utilized to coat the surface of the shell formed on the mandrel.

The mandrels carrying shells 14 which have just been formed are carried into zone 11 which is next to zone 10. Polymerization of the resin impregnating the shells continues during travel in this zone, so that at exit 12 of heating compartment A, polymerization is substantially terminated.

The shells are then removed from the mandrels, for example by cutting them along two diametrically opposed generatrices, or by disengaging them from the mandrels, the latter being preferably expansible in this case.

The empty mandrels are brought into shaping position by conveyor 13, which has served in moving the mandrels with the shells thereon from the shaping station to the exit of the heating compartment.

It is seen that this apparatus permits continuous manufacture of shells.

It is understood that the invention is not limited to the illustrated form of execution. Thus, molded or compacted articles may be obtained from a thin mat impregnated with heat hardening resin deposited by folds in the mold, with possible additional injection of resin between each fold, the operating conditions being moreover similar to those of the process described above.

Figure 4:
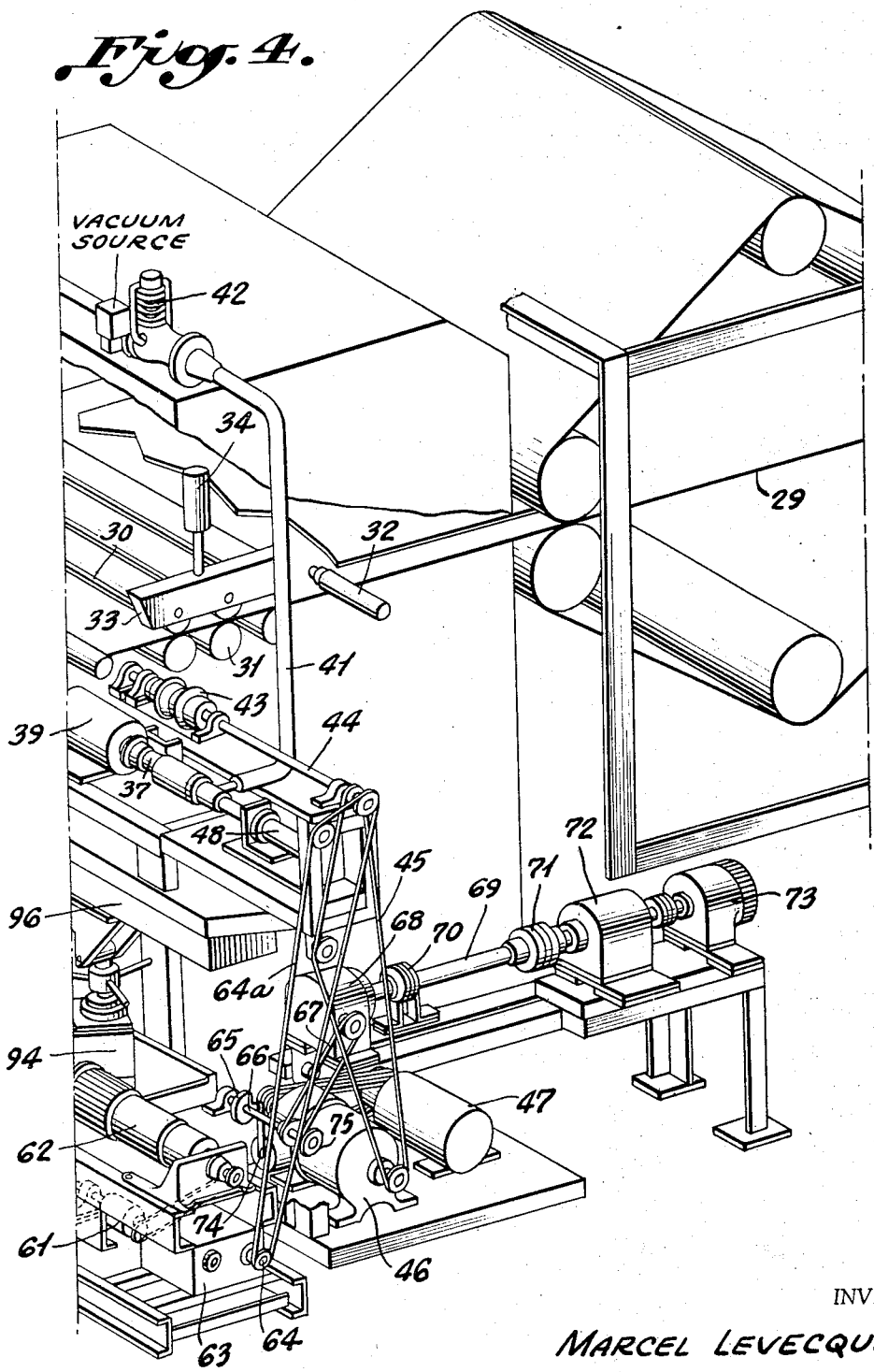
FIG. 4 is a perspective view of the calendering device for the mat beyond the feeding station shown in FIG. 3.
Figure 5:
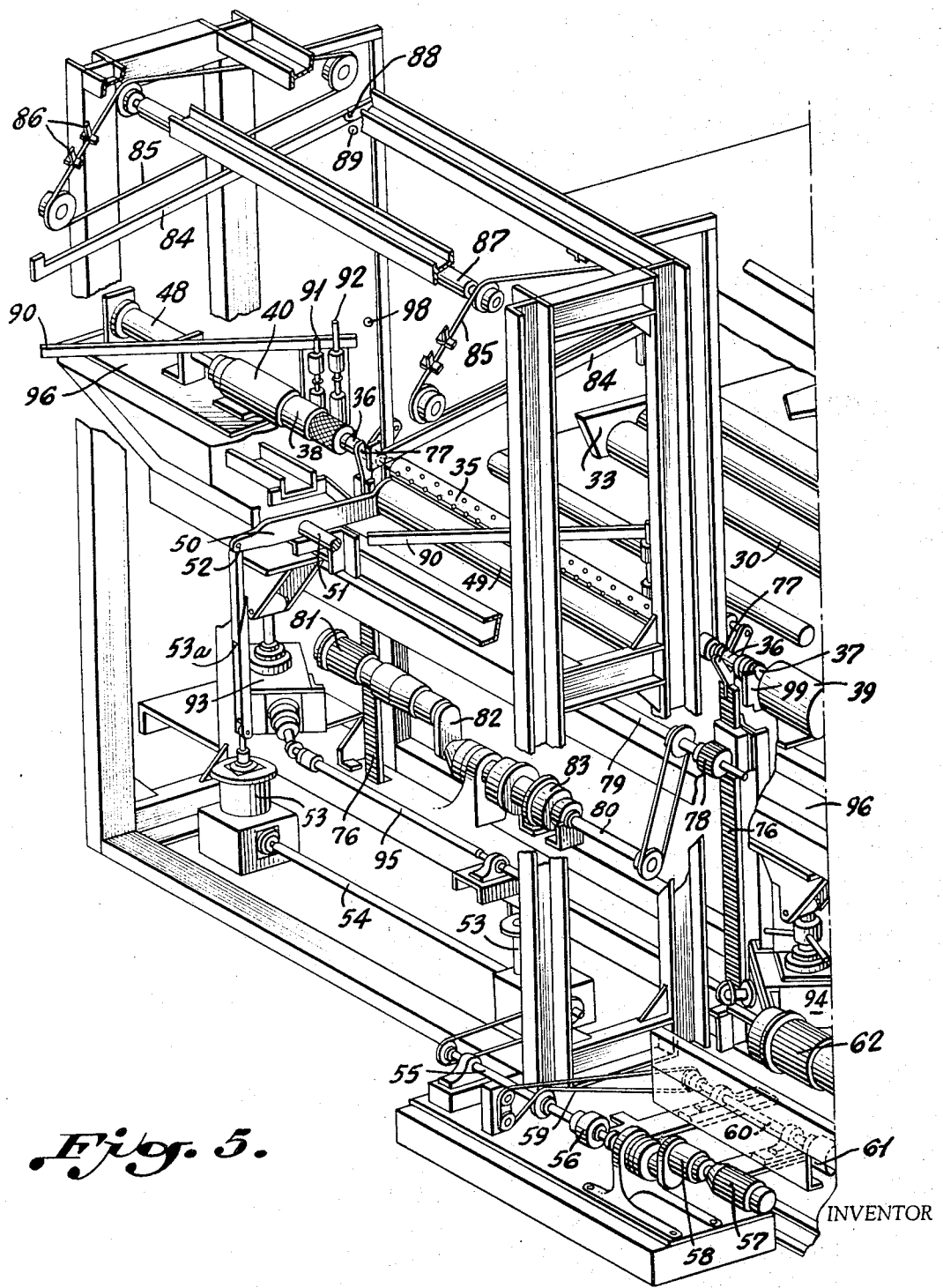
FIG. 5 is a perspective view of the coiling apparatus for the mat showing particularly the mandrel assembly with cooperating counter-roller and the control devices therefor.

In the embodiment of the invention shown in FIGS. 3 to 5, the band of matting M coming from the drying tunnel is conducted toward the device for manufacturing shells. The band passes between rollers 21–22, after having formed a loop 1$a$, then is conducted by an endless belt 23 passing over rollers, particularly an entry roller 24 above which is a roller 25 in contact with the mat. The last-mentioned two rollers serve as driving rollers.

A lever 27 is engageable with shaft 26 of roller 22 and may be activated by a jack 28 to exert a braking action on roller 22 at the same time as the control of said roller is disengaged. This action is such that it provokes the tearing of the band of matting by roller 25 which continues to conduct the band. This arrangement allows the band of matting to be cut according to the desired lengths. The tear which is formed is reduced in thickness so as to avoid unevenness in thickness of the shell when several sheets are wound to form a single shell.

The band of matting travels next on a conveyor cloth 29 which carries it between calendering rollers 30 and 31. In front of these rollers is placed a photo-electric cell 32, the function of which will be explained later.

The axes of the rollers 31 are in a fixed plane while the axes of rollers 30 are carried in a mounting frame 33 which is capable of being lowered or raised by means of jacks 34.

During its travel on conveyor bands 23 and 29, the band of matting is subjected to heating to effect the pre-polymerization of the resin, said conveyor bands travelling through ovens having heating means therein.

After leaving conveyor 29, the mat is rolled on a mandrel 35 which is hollow and which has perforations on its surface. This mandrel is mounted between pins 36 which are integral with shafts 37 and 38, mounted in rotating supports 39 and 40, respectively. Shaft 37 is hollow and communicates through a duct 41 with a vacuum source, this communication being controlled by an electric valve 42.

Shaft 37 may be set in rotation through the intermediary of a coupling gear or clutch 43 which is connected to a shaft 44, which in turn is rotated by chain 45 connected to the output of a speed changer 46 controlled continuously by motor 47.

Jacks 48 on the end of shafts 37, 38 act to maintain mandrel 35 between points 36. When these jacks are activated to eliminate the axial thrust on shafts 37 and 38, the mandrel is freed.

While the mat is being wound on mandrel 35, counter-roller 49 acts as a presser thereagainst. This roller 49 is mounted on arms 50 which are jointed at 51 to the framework of the apparatus. The free end 52 of each of these arms is pivotally mounted to rods 53$a$ which are urged by mechanical jacks 53 connected together by means of shaft 55. These two jacks 53 are moved synchronously by a shaft 55, entrained by a motor and reducer set 57, 58, through the intermediary of a coupling or clutch 56. Shaft 55 can also be entrained by a motor-reducer set 62 through the intermediary of a belt 59, counter-shaft 60 and clutch 61. The set 62 also controls a mechanical speed changer 63 whose shaft 64 is linked by chain 64a to shaft 44.

A cam 65 is brought into rotation by a shaft 66 connected by chain 67 to a reducer 68 controlled by a shaft 69. The latter is entrained by a continuously rotating motor 72 through the intermediary of a speed changer 72, coupling 71 and clutch-brake 70. Cam 65 acts on lever 74 which controls the change in speed of speed-changer 46.

On the end of shaft 66 is mounted a disc 75 which controls two limit switches, one corresponding to the setting out or start of the cam, and the other to its stopping.

Besides the parts which have just been described and which concern the winding of the band of matting on the mandrel with the desired density, the apparatus shown in FIG. 3 also has the following means designed for removing a shell-loaded mandrel and its replacement by a new mandrel preparatory to winding a new shell thereon.

Vertical toothed bars 76 are provided under bearing pins 36, each ending in a V-shaped terminal piece capable of engaging the corresponding pin. These toothed bars may be actuated by means of pinions 78 mounted upon a shaft 79. The latter is controlled by a shaft 80 operated by motor 81 through a reducer 82 and a clutch-brake 83.

At the top of the installation are provided two parallel rails 84 designed for discharging the mandrels with their shells wound thereon, above which turn endless chains 85 bearing stops or cleats 86. A shaft 87 between a correspondingly positioned sprocket of each chain assures synchronous action therebetween.

It will be noted that rails 84 have an articulated part 88 which rises during passage of the ends of the mandrels and which, in falling back, interrupts the current in cell 89.

The introduction of the empty mandrels is accomplished by inclined rails 90, at the lower extremity of each of which are provided fingers 91, 92 which are in motion pneumatically, and which exert a stopping action on the mandrels.

The installation also comprises mechanical jacks 93, 94 joined by a shaft 95, and by means of which the height of table 96 can be regulated. Supports 38 and 39 are mounted on this table, and consequently the height of the mandrel shaft may thus be varied.

Counter-roller 49 is preferably actuated by a rotary movement, for example by synchronized chains and pinions, this rotary movement corresponding to the linear speed of the conveyor band 29.

This installation functions in the following manner: The front edge of a band of matting M, upon passing in front of photocell 32, puts in motion various register or timed contact mechanisms which effect the following functions:

Electro-valve 42 connects the interior of the mandrel 35 with the source of reduced pressure. At the same time, a second clock mechanism is started up to re-close electro-valve 42 and consequently to eliminate the reduced pressure or vacuum in the mandrel at the end of a predetermined time interval. Clutch 70 comes into action in order to control the rotation of cam 65, the contour of this cam being regulated as a function of the inner and outer diameters of the shell to be fabricated.

At the same time that the cam 65 is placed in operation, the descent of the counter-roller 49 is controlled by motor-reducer 62, clutch 61 and jacks 53.

The leading end of the band of matting passes under calendering rollers 30, which now are not lowered, and is seized by mandrel 35 by the effect of the vacuum in the latter. The mat winds onto the mandrel at the same time that the counter-roller 49, which exerts a pressure on the winding, descends progressively under the effect of jacks 53.

After the formation of the first coils of the winding of the band of matting on the mandrel, the pneumatic jacks 34 act on calendering rollers 30 to lower them and to compress them against the band of matting.

The winding of the band of matting on mandrel 35 continues, counter-roller 49 exerting a pressure which gives the mat the desired final density. The speed of rotation of the mandrel is made variable in order to keep constant the linear speed of the mat during winding. This control of the change of speed of the mandrel is obtained by action of cam 65 on lever 74 acting on the speed-changer 46. At the end of winding, the limit switch controlled by disc 75 causes cam 65 to stop through action of clutch 70. This switch also controls the rise of calendering rollers 30. In addition, it controls the uncoupling of 61, which effected the normal descent of counter-roller 49 under the action of motor-reducer set 62 as well as clutch 56. The motor-reducer set 57, 58 then effects a rapid descent of the counter-roller 49 which exerts a smoothing action on the mat.

When the counter-roller 49 is no longer in contact with the shell which has just been formed on the mandrel, a limit switch effects the withdrawal of bearing pins 36 by jacks 48, and sets in operation the motor-reducer set 81, 82 which raises the toothed bars 76.

In the course of their withdrawal, shafts 37 and 38 actuate the limit switches which control clutch 83 for raising the toothed bars 76. At the same time, cam 65 is re-set to its zero position by clutch 70. This resetting is arrested by a limit switch which requires regulation or adjustment only in case the cam 65 is changed.

The withdrawal of shafts 37, 38 also regulates the stopping of the mandrel by uncoupling of clutch 43, as well as the re-ascent of counter-roller 49 by means of clutch 56 and the operation of motor-reducer set 57, 58, the direction of rotation of which is reversed. This ascent of roller 49 is stopped by a limit switch which cuts off the flow of current to motor 57.

The toothed bars 76 which grasp the mandrel with its shell by the ends 77 in the shape of forks, cause the mandrel to go up again until a limit switch stops the control set 81, 82 by uncoupling clutch 83. The mandrel is discharged by means of rails 84. When the latter falls again, after having removed the full mandrel to the passage therefor, articulated part 88 of one of the rails controls cell 89 which starts the operation of the control set 81, 82 in a reverse direction. Thereby, the toothed bars 76 are lowered again, this descent taking place in two separate stages, between which a stop occurs to take on an empty mandrel.

The empty mandrels are directed by rails 90 and fingers 91, 92, to effect their segregated distribution. The empty mandrel, coming to a stop against finger 92, is freed by the withdrawal of this finger while the toothed bars are stopped a little below rails 90 in the desired position so that the mandrel may drop between forks 77. This stopping of the toothed bars is regulated by a contact which acts to uncouple clutch 83. This contact also controls, on the one hand, the finger 92 which is lowered to free the empty mandrel to let it fall on forks 77, and, on the other hand, finger 91 which rises again to hold back the following empty mandrels.

In dropping into forks 77, the empty mandrel controls a cell 98 which causes clutching of the clutch 83, thereby resuming the descent of the toothed bars 76. When the empty mandrel reaches stationary parts 99 in the shape of a V, a limit switch effects the stopping of set 81–82, and consequently the toothed bars. The last-mentioned switch controls, at the same time, the mounting of the opposite ends of the empty mandrel between the bearing pins by the operation of jacks 48, and the operation of clutch 43 to set the mandrel in rotation. The winding operation on this mandrel begins again with another band of matting in the same circumstances as described above.

Figure 6:
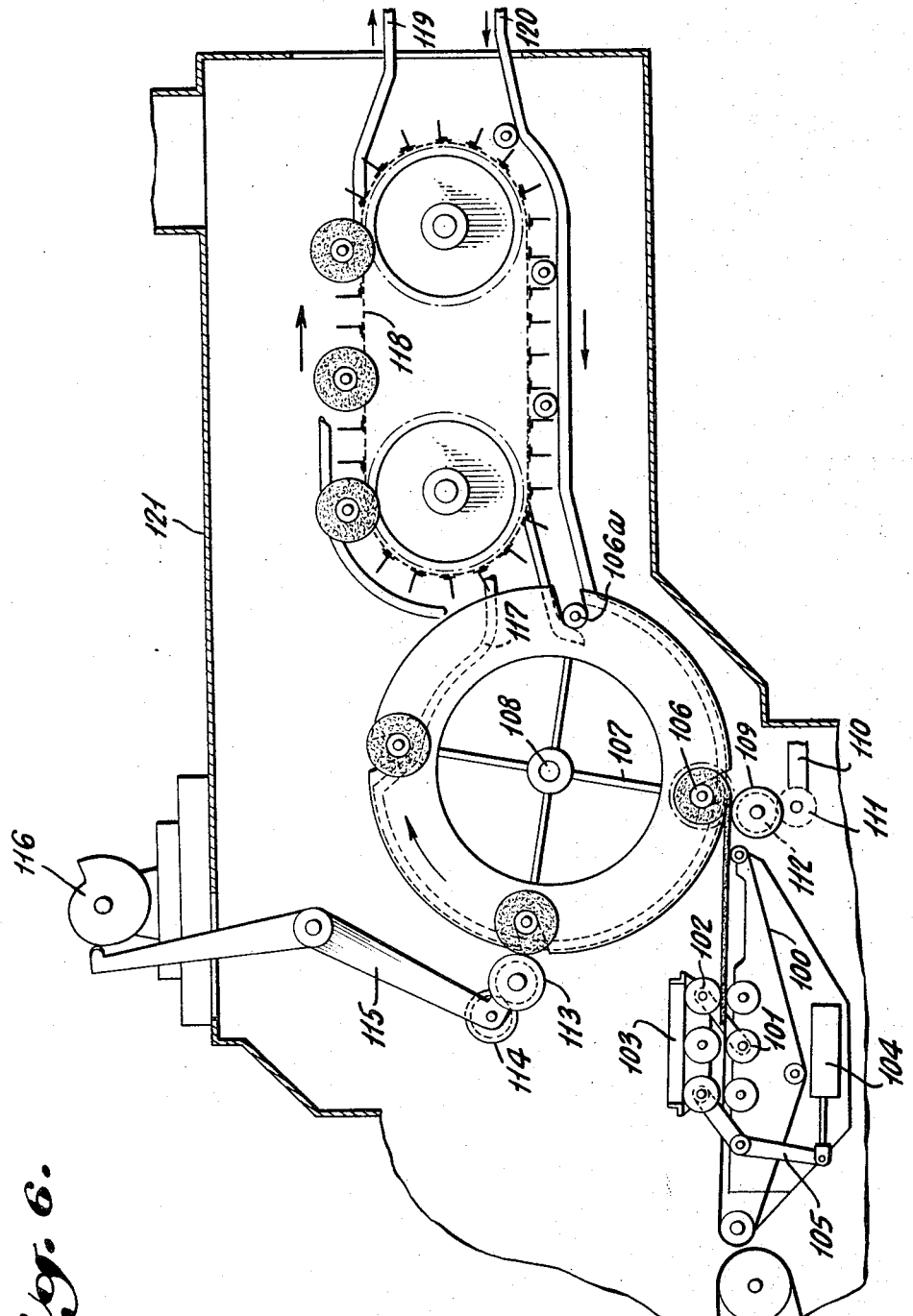
FIG. 6 is a longitudinal vertical sectional view of a third embodiment of the invention.

In the embodiment shown in FIG. 6, the band of matting, impregnated with resin brought to the plastic polymer state, is carried along by an endless conveyor band 100 between calendering rollers 101, 102. The axes of rollers 101 are in a fixed plane, and rollers 102 are mounted on a support 103, the descent of which, and hence the pressure on the band of matting, is regulated by means of jack 104, which is joined by levers 105 to said support. These rollers act in a manner similar to that of rollers 30 in the embodiment described above.

The band of matting is conducted over a mandrel 106 the central axle of which is supported by one of arms 107 of a rotary mechanical device which is actuated by a rotary movement of shaft 108. The mandrel is hollow and perforated on its wall; it may be connected to a source of fluid under reduced pressure.

A counter-roller 109 cooperates with mandrel 106. This counter-roller is set in motion by a double movement: a rotary movement about its axis and a withdrawing and approaching movement relative to the mandrel. The rotary movement corresponds to the linear speed of the endless conveyor band 100. Its withdrawal movement has a speed which is a function of the density desired for the shell and which is controlled by a cam acting on a lever 110, at the extremity of which is rotatably mounted a pinion 111 engaging with a pinion 112 wedged on the counter-roller.

Upon its arrival, the band of matting is not subjected to the action of the calendering rollers 102, in order to preserve its porosity. When it comes into contact with mandrel 106, the vacuum acting at the interior of the latter effects adherence of the extremity of the band with the mandrel, and the winding operation is started. Calendering rollers 102 are lowered while compressing the mat, and the winding continues under the effect of the rotation of counter-roller 100, at the same time that the wound mat reaches the desired density under the effect of the pressure exerted by the counter-roller.

The shell being thus formed on the mandrel, the mechanical device is put in rotation in order, on the one hand, to introduce a new mandrel 106a in place, for the formation of a new shell and, on the other hand, to bring the full mandrel into contact with another counter-roller 113, itself experiencing a rotary movement while being held pressed against the shell by a roller 114 which is mounted on a lever 115. The opposite end of the latter is in contact with a cam 116. The role of this counter-roller is to smooth the surface of the shell.

During the following rotation of the rotary mechanical device and shaft 108, the mandrel bearing the smoothed shell is emptied by rails 117 which conduct it on a conveyor pallet 118 from which it is ultimately discharged at exit 119. At the same time this conveyor conducts the empty mandrels coming from inlet 120 toward the winding station.

As in the preceding embodiment, the mat is brought to the device for forming the shell when the resin impregnating the mat is jellified and begins to polymerize. Oven 121 surrounding the shell-forming device is at a temperature such that the resin is brought to its hard polymer state when the shell is completed.

It must be understood that the invention is not limited to the forms of execution just described, but can be realized according to several variations. Thus, in particular, the winding of the band of matting can take place pneumatically by means of nozzles fed by compressed air and located around the mandrel, so as to apply the mat on the mandrel exteriorly thereof and to effect its winding on the latter.

I claim:

1. An apparatus for producing hollow cylinders of resin-impregnated mineral fibers comprising a winding station, means for mounting a rotary cylindrical mandrel at said station, a conveyor for feeding a mat of mineral fibers impregnated with a jellified resin to said station and the mandrel thereat, phenumatic means acting directly on the mat for winding said mat onto said mandrel, and means in advance of the rotary mandrel to compress the mat and thereby to control the specific density of the finished cylindrical shell after its final hardening.

2. An apparatus as set forth in claim 1 including pressing means cooperating with said rotary mandrel to control additionally the specific density of the mat in the course of the winding operation.

3. An apparatus for producing hollow cylinders of resin-impregnated mineral fibers comprising a winding station, means for mounting at said station a hollow cylindrical mandrel with perforations in the outer wall thereof, a conveyor for feeding a mat of mineral fibers impregnated with a jellified resin to said station and the mandrel thereat, connections from the interior of said hollow mandrel to a source of reduced pressure, and means for rotating said mandrel to effect the winding of the mat thereon following the seizure of the forward edge of the mat by the suction effects exerted on the outer wall of the mandrel.

4. An apparatus as set forth in claim 3 including means in advance of said winding station for compressing said impregnated mat following the seizure of the leading edge thereof by said mandrel to increase the specific density of said mat.

5. An apparatus as set forth in claim 3 wherein the rotary movement of the mandrel is variable to render the winding speed constant and conformable to the constant lineal travel of said mat on said conveyor.

6. An apparatus for producing hollow cylinders of resin-impregnated mineral fibers comprising a winding station, means for mounting at said station a hollow cylindrical mandrel with perforations in the outer wall thereof, a conveyor for feeding a mat of mineral fibers impregnated with a jellified resin to said station and the mandrel thereat, connections from the interior of said hollow mandrel to a source of reduced pressure, means for rotating said mandrel to effect the winding of the mat thereon following the seizure of the forward edge of the mat by the suction effects exerted on the outer wall of the mandrel, and a rotary counter-roller cooperating with said mandrel with the longitudinal axis of said roller parallel to that of the mandrel and displaceable relative thereto to exert a pressure upon the mat as the same is wound upon said mandrel, to control the specific density thereof.

7. An apparatus as set forth in claim 6 wherein the displacement movement of the counter-roller relative to the mandrel and coiled mat thereon is variable to control the density of the hollow cylinders.

8. An apparatus as set forth in claim 7 wherein no displacement movement of the counter-roller takes place at the conclusion of the winding operation to effect a smoothing only of the exterior of the hollow cylinder.

9. An apparatus as set forth in claim 6 wherein both the displacement movement of the counter-roller relative to the mandrel and mat wound thereon, as well as the speed of rotation of the counter-roller are varied as the winding of the mat progresses.

10. An apparatus for producing hollow cylinders of resin-impregnated mineral fibers comprising a movable frame having a winding station, means for mounting at said station a hollow cylindrical mandrel with perforations in the outer wall thereof, a conveyor for feeding a mat of mineral fibers impregnated with a jellified resin to said station and the mandrel thereat, connections from the interior of said hollow mandrel to a source of reduced pressure, means for rotating said mandrel to effect the winding of the mat thereon following the seizure of the forward edge of the mat by the suction effects exerted on the outer wall of the mandrel, a rotary counter-roller cooperating with said mandrel with the longitudinal axis of said roller parallel to that of the mandrel and displaceable relative thereto to exert a pressure upon the mat as the same is wound upon said mandrel to control the specific density thereof, means for moving said frame at the conclusion of the winding operation to transport the mandrel with its surrounding cylinder to a smoothing station remote from said winding station, and a second rotary counter-roller adapted to cooperate with the mandrel and cylinder to smooth the external layers of the mat which are wound on the mandrel.

11. An apparatus as set forth in claim 10 including an endless conveyor cooperating with said movable frame for carrying away the mandrels with surrounding cylinders and successively bringing an empty mandrel to said winding station.

12. An apparatus as set forth in claim 6 including means for automatically removing the mandrel with its surrounding cylinder from said winding station upon its completion, and means for supplying thereafter an empty mandrel to said winding station.

References Cited

UNITED STATES PATENTS

| 2,783,174 | 2/1957 | Stephens | 154—83 |
| 2,859,151 | 11/1958 | Usab et al. | 154—83 |
| 2,906,317 | 9/1959 | Keyes | 156—371 X |
| 2,979,765 | 4/1961 | Stephens et al. | 18—6 |
| 3,039,140 | 6/1962 | Andrews | 18—6 |
| 3,063,887 | 11/1962 | Labino | 156—446 X |

FOREIGN PATENTS 556,533   5/1958   Canada.

EARL M. BERGERT, *Primary Examiner.*

ROBERT F. WHITE, *Examiner.*

M. R. DOWLING, P. DIER, *Assistant Examiners.*